(12) United States Patent
Wang et al.

(10) Patent No.: US 8,537,468 B1
(45) Date of Patent: Sep. 17, 2013

(54) ULTRA COMPACT OPTICAL MULTIPLEXER OR DEMULTIPLEXER

(75) Inventors: Xuan Wang, San Jose, CA (US); Andy Zhou, Fremont, CA (US); Yao Li, Newark, CA (US); Wei-Shin Tsay, Saratoga, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 51 days.

(21) Appl. No.: 13/158,172

(22) Filed: Jun. 10, 2011

Related U.S. Application Data

(63) Continuation-in-part of application No. 13/030,076, filed on Feb. 17, 2011, now Pat. No. 8,488,244.

(60) Provisional application No. 61/404,252, filed on Oct. 1, 2010.

(51) Int. Cl.
  *G02B 27/10* (2006.01)
  *G02B 3/00* (2006.01)
(52) U.S. Cl.
  CPC ........................... *G02B 3/005* (2013.01)
  USPC .......................... 359/619; 359/621

(58) Field of Classification Search
  USPC .................................................. 359/237–332
  See application file for complete search history.

(56) References Cited

U.S. PATENT DOCUMENTS

| | | | | |
|---|---|---|---|---|
| 6,636,654 B2 * | 10/2003 | McGuire, Jr. | ................... | 385/17 |
| 6,748,133 B2 * | 6/2004 | Liu et al. | ........................ | 385/24 |
| 7,215,853 B2 * | 5/2007 | Morita et al. | ................... | 385/47 |
| 2004/0067014 A1 * | 4/2004 | Hollars et al. | .................. | 385/33 |

* cited by examiner

*Primary Examiner* — Scott J Sugarman
*Assistant Examiner* — Robert E Tallman
(74) *Attorney, Agent, or Firm* — Wuxi SinoIP Agency, Ltd.; Joe Zheng

(57) ABSTRACT

Designs of optical devices providing multiplexing or demultiplexing functions are disclosed. According to one embodiment, an optical device or an assembly employs an array of micro lenses, an array of filters and a mirror or an array of mirrors all bonded onto a substrate to provide multiplexing or demultiplexing functions. To compensate for possible errors caused by some or all of these components, one or more compensatory optical plates are provided to respectively correct these errors. Depending on implementation, the compensatory optical plates may be designed differently to correct various errors.

22 Claims, 17 Drawing Sheets

ULTRA COMPACT OPTICAL MULTIPLEXER OR DEMULTIPLEXER

CROSS-REFERENCE TO RELATED APPLICATION

This application is a continuation-in-part of U.S. application Ser. No. 13/030,076, filed on Feb. 17, 2011, and claims the benefits of the provisional application, No. 61/404,252, entitled "ULTRA-COMPACT MUX/DEMUX", filed on Oct. 25, 2010, which is hereby incorporated by reference for all purposes.

BACKGROUND OF THE INVENTION

1. Field of the Invention

The invention is generally related to the area of optical communications. In particular, the invention is related to optical devices, modules or assemblies to process light beams and the making thereof. The optical devices modules or assemblies include, but may not be limited to, multiplexing devices and adding/dropping devices.

2. The Background of Related Art

The communication networks continue to demand increasingly bandwidths and flexibility to different communication protocols. Fiber optic networks are becoming popular for data transmission due to their high speed and high capacity capabilities. Wavelength division multiplexing (WDM) is an exemplary technology that puts data from different sources together on an optical fiber with each signal carried at the same time on its own separate light wavelength. Using the WDM system, separate wavelengths or channels of data can be multiplexed into a light stream transmitted on a single optical fiber. To take the benefits and advantages offered by the WDM system, there require many sophisticated optical network elements.

Optical add/drop devices are those elements often used in optical systems and networks. For example, an exchanging of data signals involves the exchanging of matching wavelengths from two different sources within an optical network. In other words, the multi-channel signal would drop a wavelength while simultaneously adding a channel with a matching wavelength at the same network node.

From a terminology viewpoint, a device that multiplexes different wavelength channels or groups of channels into one fiber is a multiplexer, and a device that divides the multiplexed channels or groups of channels into individual or subgroups of channels is a demultiplexer. Specifically, a multiplexer combines several channels of optical signals into a single signal, or in reverse a demultiplexer separates a single multichannel signal into several individual channel signals, such multiplexer or demultiplexer is referred to a multiplexing or demultiplexing module, or simply multiplexer or demultiplexer.

Multiplexers/De-multiplexers (Mux/DeMux) are needed in optical modules such as quad small-form-factor pluggable (QSFP). The QSFP is a full-duplex optical module with four independent transmit and receive channels. It is designed to replace four single-channel small-form-factor pluggable (SFP) and in a package only about 30% larger than the standard SFP. To equip such an QSFP, the size of a Mux/DeMux module into a QSFP, the size of the module is very important. Accordingly, there is a great need for such optical modules being made small, and at the same time, the modules so designed are amenable to small footprint, broad operating wavelength range, enhanced impact performance, lower cost, and easier manufacturing process.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

In general, the present invention pertains to improved designs of optical devices, particularly for dropping a selected wavelength or a group of wavelengths as well as demultiplexing a multiplexed signal into several signals. The same devices can also perform adding or multiplexing functions. For simplicity, a selected wavelength or a band signal will be deemed or described as a channel hereinafter. According to one aspect of the present invention, an optical device or an assembly employs an array of micro lenses, an array of filters and a glass block all bonded onto a substrate to provide multiplexing or demultiplexing functions. To compensate for possible errors caused by some or all of these components, one or more compensatory optical plates are provided to respectively correct these errors. Depending on implementation, the compensatory optical plates may be designed differently to correct various errors.

The optical devices so designed in accordance with the present invention are amenable to small footprint, enhanced impact performance, lower cost, and easier manufacturing process. Various embodiments of the present invention may be used in many areas such as optical communications and devices and may be implemented in many ways as a sub-system, a device or a method. According to one embodiment, the present invention is an optical apparatus comprising a collimator, a glass block coated with a first coating and a second coating on one side, an array of filters affixed to another side of the glass block, each of the filters passing through one specified wavelength, an array of micro lenses, the glass block, the filters and the micro lenses, and a substrate on which the collimator, glass block and micro lenses are boned, where the glass block is tilted with respect to the collimator and the array of micro lenses to ensure that each of the micro lenses corresponds to one of the filters. Depending on implementation, one or more compensative plates may be inserted between the array of filters and the array of micro lenses to correct optical errors introduced by one or more of these components.

According to another embodiment, the present invention is an optical assembly that comprises: an optical device to generate a collimated light beam; a mirror; an array of micro lenses; an array of filters disposed between the mirror and the micro lenses; and a substrate on which the optical device, the mirror and the micro lenses are boned, where the mirror is tilted with respect to the array of filters and the array of micro lenses to ensure that each of the micro lenses corresponds to a light beam from a corresponding one of the filters. Depending on implementation, the optical device to generate a collimated light beam may be a collimator or a micro lens, and the mirror may be a single piece reflective plate or composed of an array of mirrors, each of the mirrors corresponding to one of the filters.

According to yet another embodiment, the present invention is an optical assembly that comprises: a substrate; a multiplexier module; and a demultiplexier module, wherein both of the multiplexier and the demultiplexier share an identical structure but are mirrored and disposed on the substrate to provide functions of multiplexing and demultiplexing in the optical assembly simultaneously. In one embodiment, the structure includes a collimator, a distance of the collimator for the multiplexier module and the collimator for the demultiplexier module is fixed per an industrial standard.

Many objects, features, and advantages of the present invention will become apparent upon examining the following detailed description of an embodiment thereof, taken in conjunction with the attached drawings

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENT

The detailed description of the present invention is presented largely in terms of procedures, steps, logic blocks, processing, or other symbolic representations that directly or indirectly resemble the operations of optical devices or systems that can be used in optical networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

According to one embodiment of the present invention, designs of optical devices providing multiplexing or demultiplexing functions are disclosed. These devices are also referred to as ultra-compact WDM filters or assemblies. The size of the devices is small enough to fit many small form-factor optical modules such as Quad Small Form-factor Pluggable (QSFP) optical module for telecommunications or data communication equipment. The QSFP modules are the next generation of pluggable modules intended for high density applications. It is designed to replace the industry standard four single-channel Small Form-factor Pluggable (SFP) devices. According to one embodiment, such a QSFP module can support data rates up to 10 Gbits/sec like its single-channel counterpart. With four channels each running at 10 Gb/sec, the QSFP is the most practical solution for 40 Gb/sec.

Figure 1:
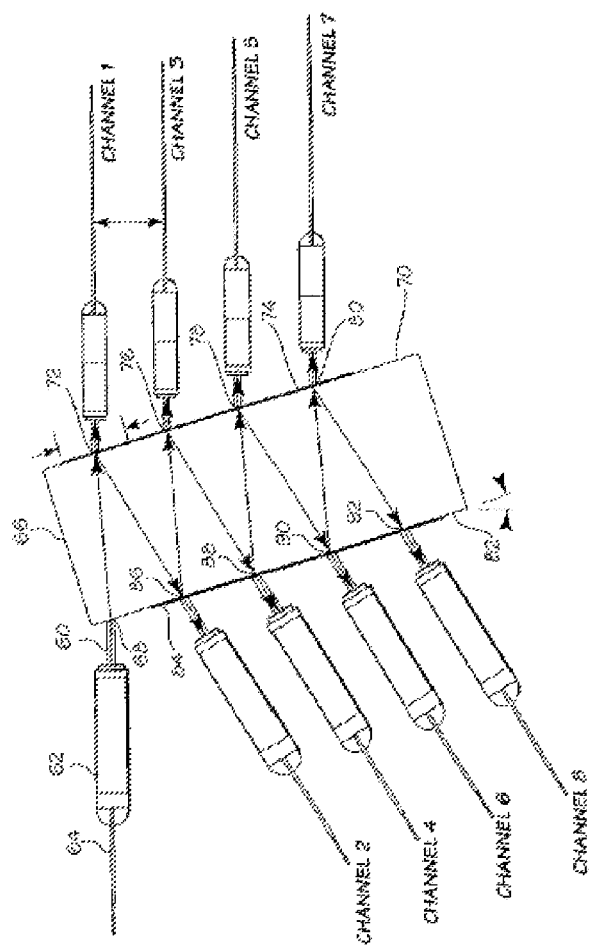
FIG. 1 shows a typical prior art of a multi-port filter (duplicated from U.S. Pat. No. 5,583,683) when used as a de-multiplexer (DeMux)
Figure 2:
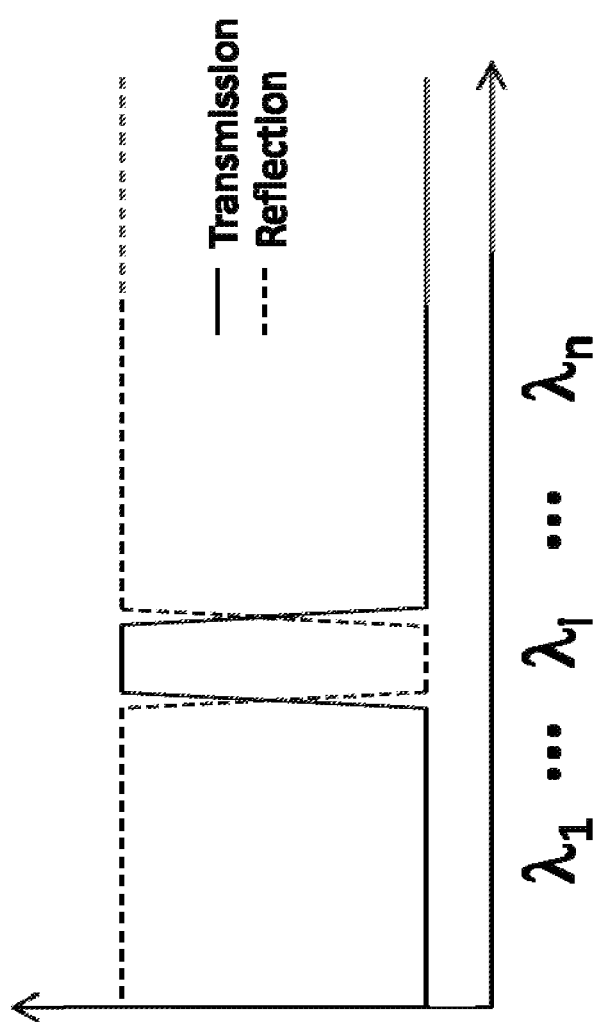
FIG. 2 shows a typical optical transmission and reflection spectrum of a single-channel band-pass filter that transmits a specific wavelength and reflects other wavelengths.

Multiplexers/De-multiplexers (Mux/DeMux) are needed in optical modules such as QSFP as a key part to combine or split 4 signals, each operating at a different wavelengths, into or from a common optical fiber or a common port. FIG. 1 shows a typical prior art of a multi-port filter (U.S. Pat. No. 5,583,683) when used as a de-multiplexer (DeMux). In the device, a multiple wavelength light traveling from a common port is separated into multiple narrow spectral bands directed to individual channels. At each of the multiple ports, a dielectric thin film filter transmits a selected wavelength and reflects all other wavelengths. FIG. 2 shows a typical optical transmission and reflection spectra of a single-channel band-pass filter that transmits a specified wavelength and reflects all wavelengths except for the specified wavelength. The reflected wavelengths (channel signals) continue propagating to a next channel port, where an in-band signal (wavelength) is transmitted through and the other channel signals (wavelengths) are reflected and propagated to subsequent ports. After multiple bounces in a zig-zag fashion, multiple channels are separated or dropped out. The device can also be used as a multiplexer (Mux) with a common port outputting all wavelengths added from the individual channels.

Figure 3:
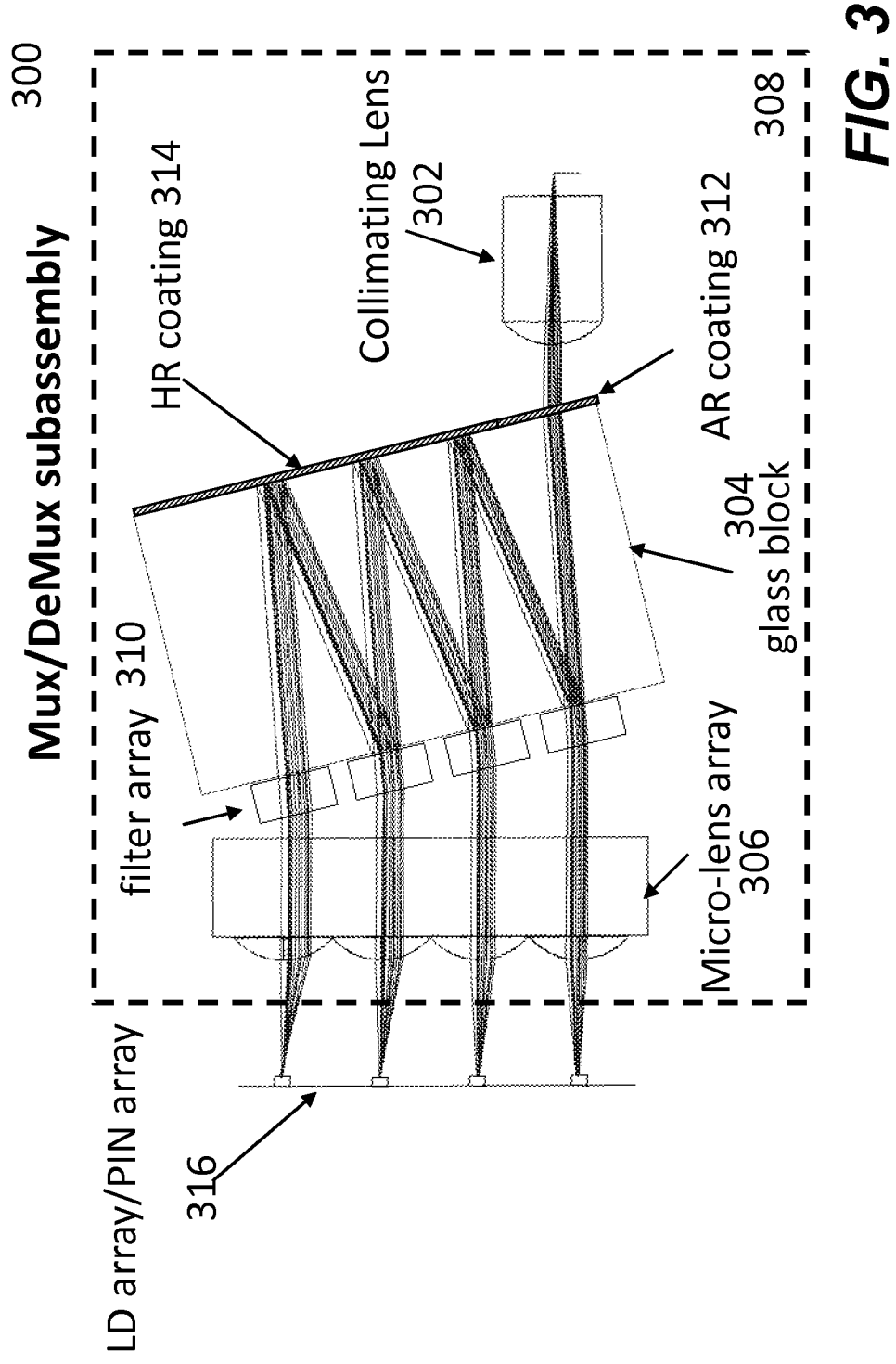
FIG. 3 shows an exemplary configuration of a Mux/DeMux assembly according to one embodiment of the present invention.

To apply the WDM device of FIG. 1 in a QSFP module, there would be at least two major dimensional challenges: 1) all channel ports of the WDM device of FIG. 1 are located on both sides of the device, which is not suitable for integration in a small form-factor platform; 2) it is difficult to fit 4 channels side by side in a QSFP module due to the limitation of the collimator width and fixtures to bond the collimator on a substrate. FIG. 3 shows an exemplary configuration 300 of a Mux/DeMux assembly according to one embodiment of the present invention. One of the benefits, advantages and objectives of the present invention is to provide such an optical device with the size and functionalities for small form factor modules such as QSFP.

As shown in FIG. 3, all major components such as a collimator 302, a glass block 304 and a micro-lens array 306 are bonded to a substrate 308. As a result, at least two distinctive features are shown in comparison to the prior art: 1) channels on one side of the device are used with filters on the other side replaced by a high-reflectance coating which reflects light with all wavelengths; 2) channel collimators were replaced by a micro-lens array. In this design, a collimated beam bounces twice before reaching the next channel. When using as a DeMux, after passing the filter, the light beam for each channel is then focused by a micro-lens with a receiver located at or around the focal point of the micro-lens. The device can be used as Mux or DeMux with transmitter/receiver array pitch matches with the pitch of the micro-lens. The convex side of micro-lens can face either a filter array or a transmitter/receiver array.

In operation, a light beam is projected into the collimating lens 302. A segment anti-reflective coating 312 on the glass block 304 transmits the light beam through the glass block 304. The light beam hits the filter array 310 that includes four filters, each is made or configured to allow one specified wavelength to pass through and reflects others. A first filter in the filter array 310 allows a wavelength to transmit through. The transmitted wavelength is projected into the micro-lens array 306. A corresponding lens on the micro-lens array 306 couples the transmitted wavelength out to a receiver. Depending on application, an array of electronic devices 316 may be a laser diode (LD), GaAs PIN photodiode or other type of device to receive the transmitted wavelength (signal) or to transmit one or more signals into the assembly 300.

Meanwhile, the first filter in the filter array 310 reflects other wavelengths. The reflected wavelengths transmit in the glass block 304 and hit a high-reflection (HR) coating on the glass block 304 that reflect the reflected wavelengths back to a second filter in the filter array 310. Similar to the first filter, the second filter transmits one wavelength and reflects all others. The transmitted wavelength goes through a corresponding lens on the micro-lens array 306 to couple the transmitted wavelength (signal) out of the assembly 300. The reflected wavelengths from the second filter continue along the remaining filters in the filter array 310 and are eventually separated and coupled out through the lens on the micro-lens array 306.

Figure 4:
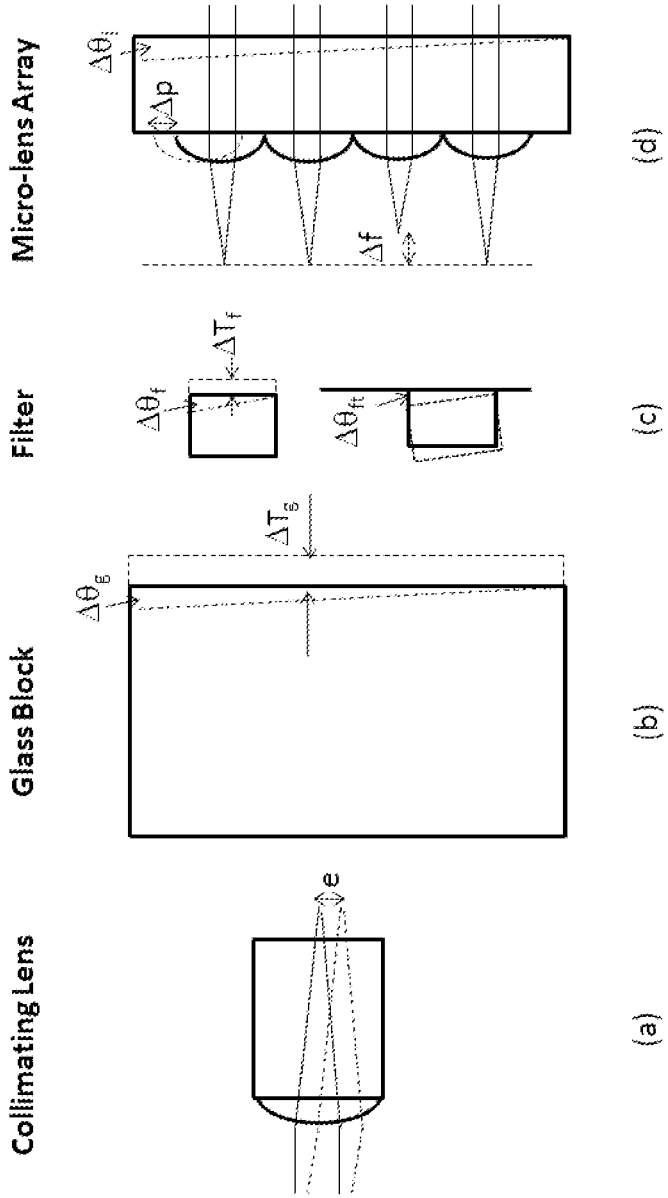
FIG. 4 shows how each of the major components may create a possible error that eventually affect the performance of the optical device shown in FIG. 3.

As the position of each channel is subject to a fixed pitch and cannot be individually adjusted like those in the prior art, the optical performance of the assembly is generally prone to dimensional errors and position errors of the components. Some errors may be compensated or eliminated during the assembling process by adjusting the positions of the components. However, there may be some errors that cannot be compensated and may contribute to degradation of optical performance. FIG. 4 depicts a number of error sources that may degrade optical performance of the assembly. These errors need to be tested and controlled before the assembly process.

Figure 5:
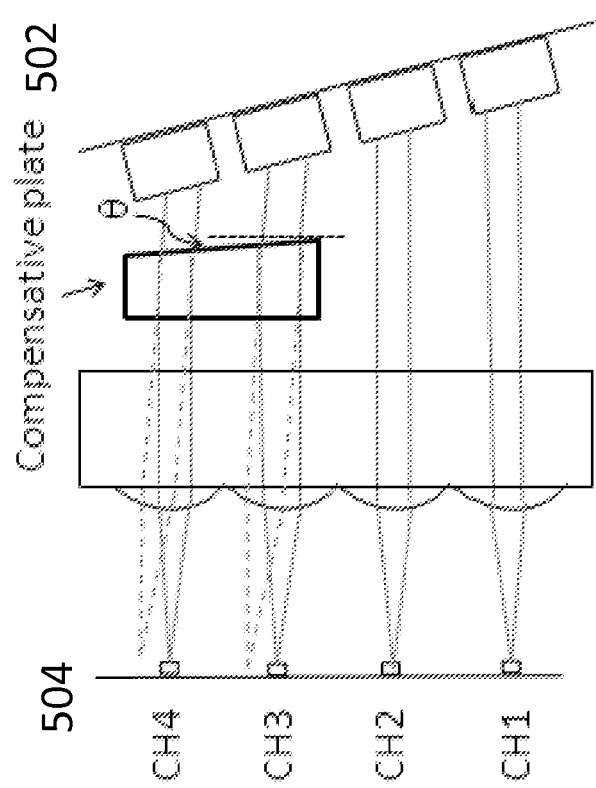
FIG. 5 shows that a compensative plate is inserted in a light path and corrects an angular error for CH3 and CH4 as an example.
Figure 6:
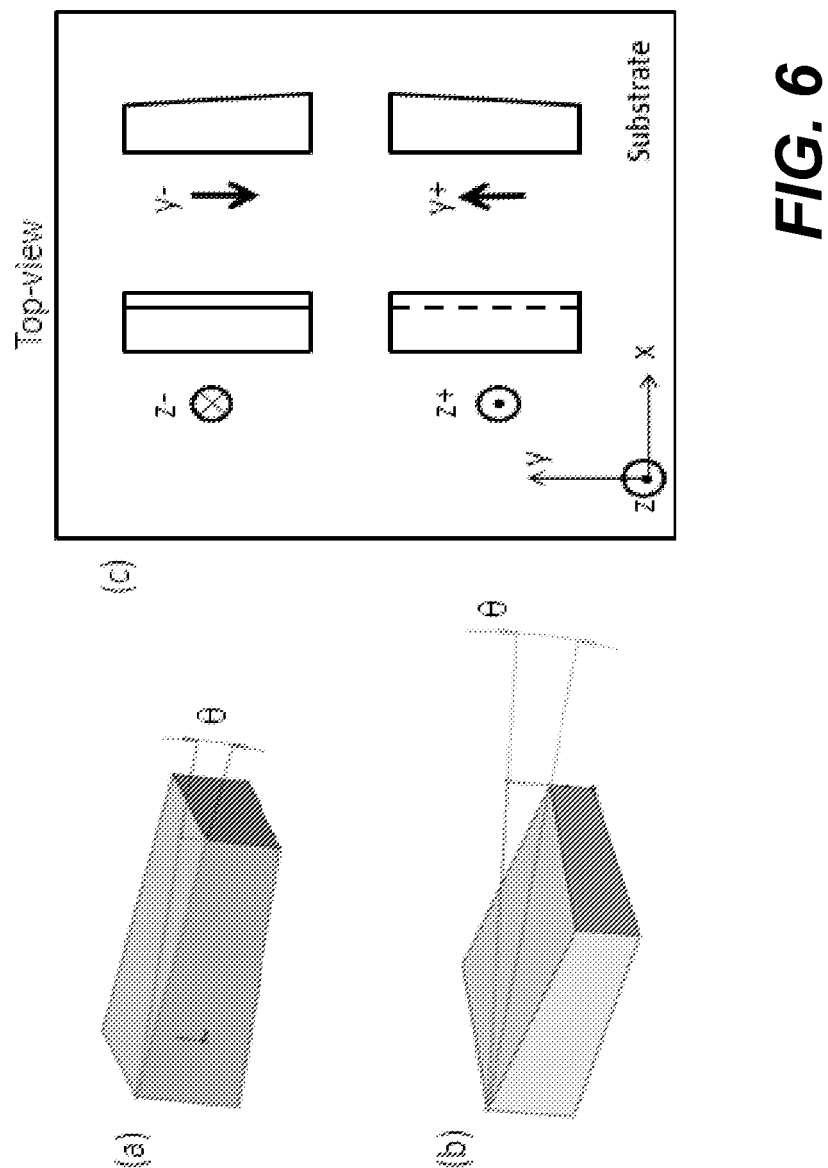
FIG. 6 shows respectively some exemplary compensative plates with different lengths that may be used to cover 1, 2 or 3 channels in an exemplary module, the compensative plates may be used in 4 different orientations to generate compensative focus offsets at directions shown in FIG. 6(*c*)

To compensate the residual incident angle error due to the combination effect of all possible error sources, a compensative plate can be inserted between the filter array 310 and the micro-lens array 306. As illustrated in FIG. 5, a compensative plate 502 is inserted on the light path and corrects the angular error for CH3 and CH4, which channels are expected to have higher errors due to the accumulating effect of the error sources. An incident angular error will result in misalignment of a focused beam at the output of the assembly and thus causes an extra loss. A number of compensative plates with different cut angles may be prepared to be used during the assembling process according to measured angular errors for specific channel(s). The compensative plates with different lengths may be used to cover 1, 2 or 3 channels. The compensative plates may be used in 4 different orientations to generate compensative focus offsets at directions shown in FIG. 6(c). An alternative compensative plate design is shown in FIG. 6(b) which will generate a focus offset at both y and z directions shown in FIG. 6(c). This compensative plate can also be used at 4 different orientations in a similar fashion.

Figure 7:
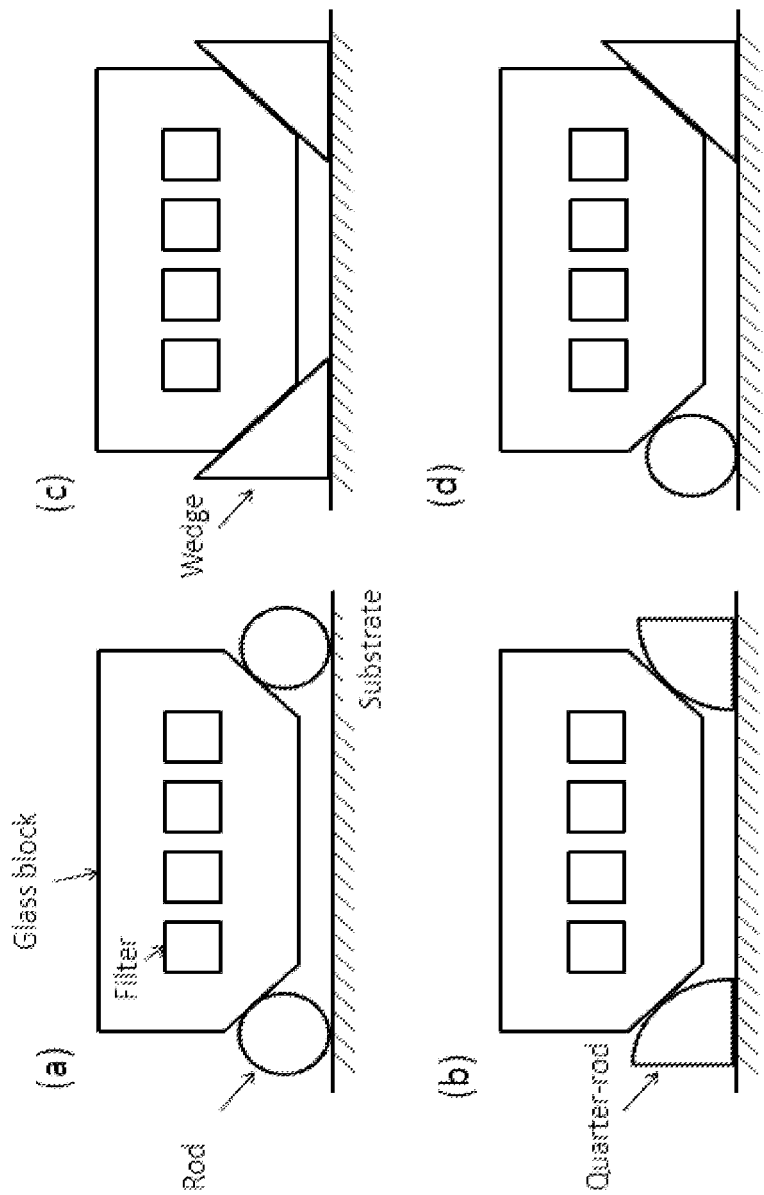
FIG. 7 shows some typical positioning aids including rods, partial-rods (quarter-rods for example), wedges or their combinations.

To ensure the position accuracy and reliability while providing sufficient degrees of freedom for positioning, a fixation aid system may be applied. Beveled edges can be created on glass block and a pair of fixation aid block can be used to fix a glass block on the substrate. FIG. 7 shows some typical fixation aid devices including rods, partial-rods (quarter-rods for example), wedges or their combinations. A sample material for the glass block or substrate is usually chosen to match the thermal expansion although other material may be used. During the assembling process, after the position of the glass block is well adjusted by the positioning device, the fixation aid device can be brought into contact with the glass block and substrate and bonded together. After inserting the fixation block, the relative position between the glass block and the substrate should be well defined.

Figure 8:
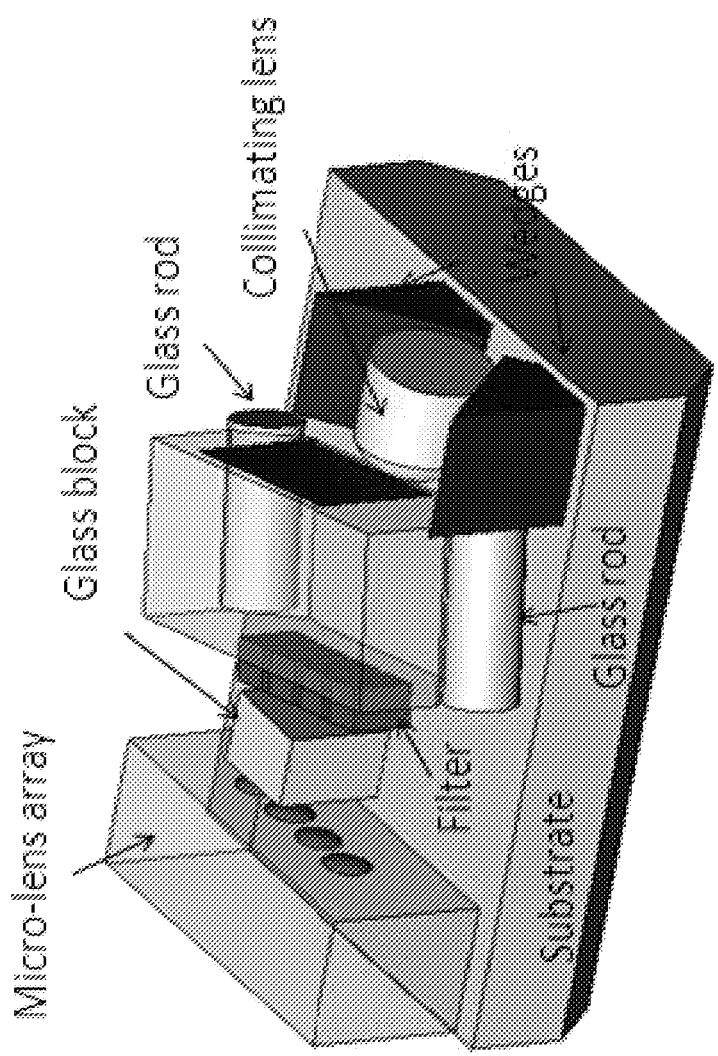
FIG. 8 shows a perspective view of an exemplary assembly with a compensative plate and some positioning aids.
Figure 9:
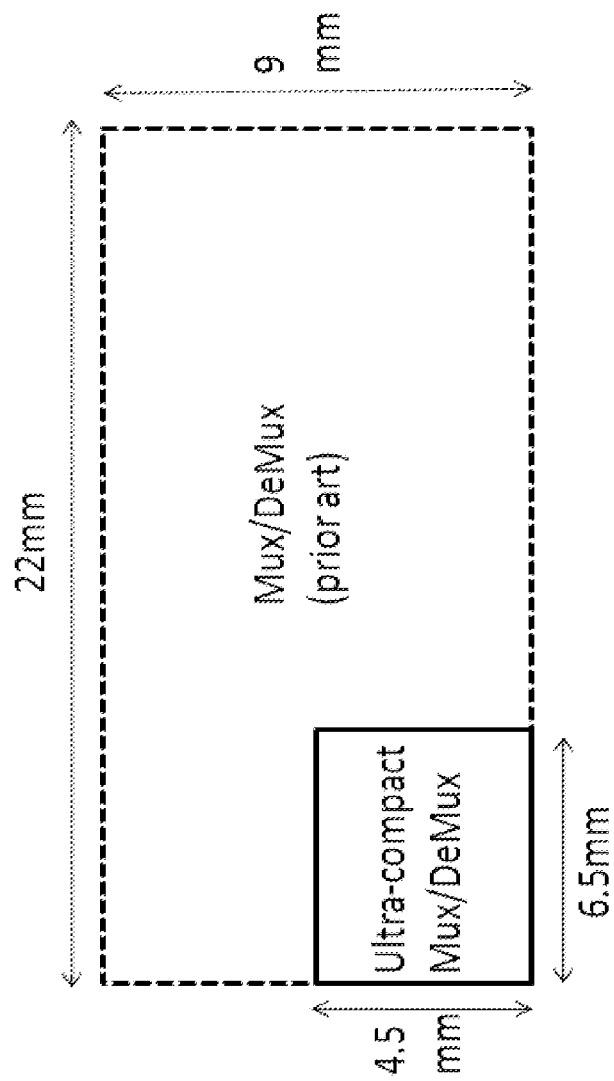
FIG. 9 illustrates graphically the estimated footprints of two designs.

FIG. 8 shows a perspective view of an exemplary assembly 800 with some compensative plate and fixation aid devices. Two wedges are used to fix the position of the collimating lens. With this design, the size of multi-port Mux/DeMux can be greatly reduced. A typical dimensions of a 4-port ultra-compact Mux/DeMux device can be 6.5 mm (L)×4.5 mm (W)×2.6 mm (H) while 22 mm (L)×9 mm (W)×4 mm (H) for the same device in the prior are design. As a result, the new design achieves 85% substrate footprint reduction. FIG. 9 illustrates graphically the footprints of the two designs.

In summary, the present invention discloses new designs of Mux/DeMux assembly. With a typically 85% size reduction compared to the prior art design, for example FIG. 1, the Mux/DeMux assembly can fit into a QSFP module. The invention also provides solution to tune the optical performance by compensating focused beam misalignment due to the dimension and position errors.

FIGS. 10-12 and FIG. 14 show respectively 3D schematics of alternative designs of the MUX/DeMUX assembly. In these designs, the filters and the mirror(s) are all bonded on a substrate, which greatly increases the degrees of freedom when positioning the filters and the mirror on the substrate. The degrees of freedom are helpful to compensate the losses due to possible component fabrication errors and position/alignment errors. Thus, with this type of designs, better optical performance and yield can be expected compared to the prior art.

Figure 10:
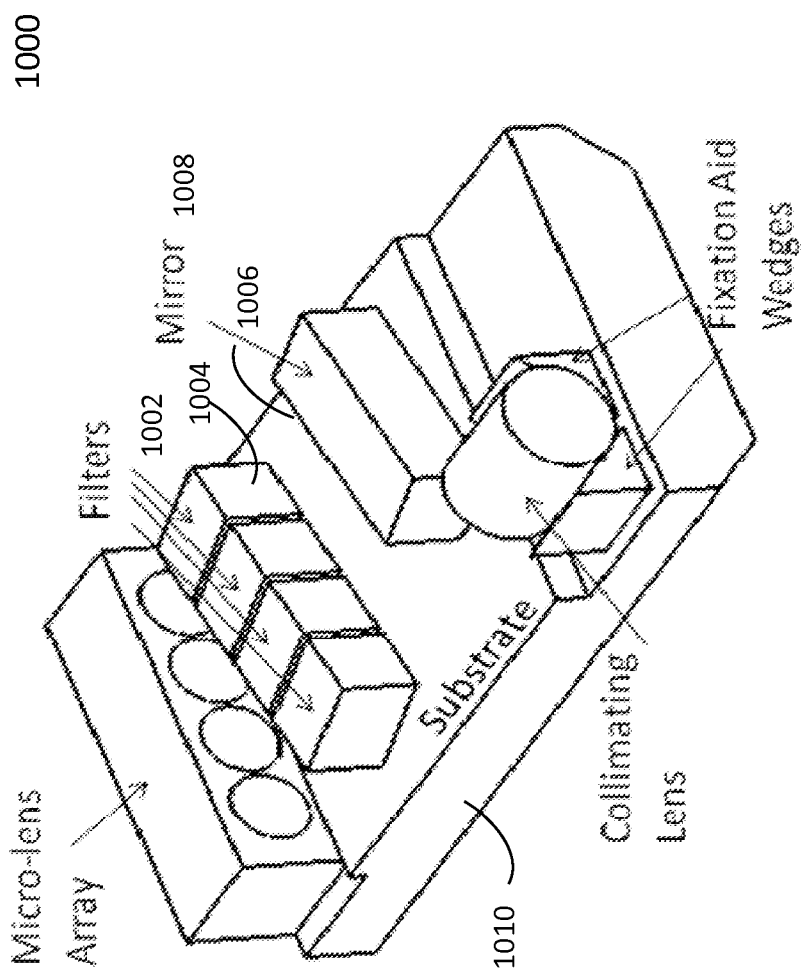
FIGS. 10-12 and FIG. 14 show respectively 3D schematics of alternative designs of the MUX/DeMUX assembly.

FIG. 10 shows a design 1000 of using four filters 1002 with the filter coating surfaces 1004 facing the mirror reflective surface 1006 of one mirror 1008. During the assembly process, the facing angle and position of each of the filters 1002 can be adjusted individually to achieve good optical performance for the corresponding channel before it is bonded to the substrate 1010. Compared to the prior art (FIG. 1), the facing angle and the position of the filters 1002 will not be limited by the glass block. Thus, the design 1000 has more degrees of freedom to adjust than the prior design and can reduce the impact of some errors. However, as all filters share a common mirror, the filter facing angle non-uniformity due to the fabrication errors of the thin-film filter may not be compensated easily. The angular errors will result in misalignment of focused beam with respect to the detector array (not shown in FIG. 10 but referenced as 504 of FIG. 5). For high speed applications where a detector area is comparable to the beam size, the focused beam misalignment would result in a significant loss of signal. One way to better control the alignment of the focused beam is to replace the shared mirror with three mirrors with each of them individually adjustable to actively compensate the facing angle error of the filter before it.

Figure 11:
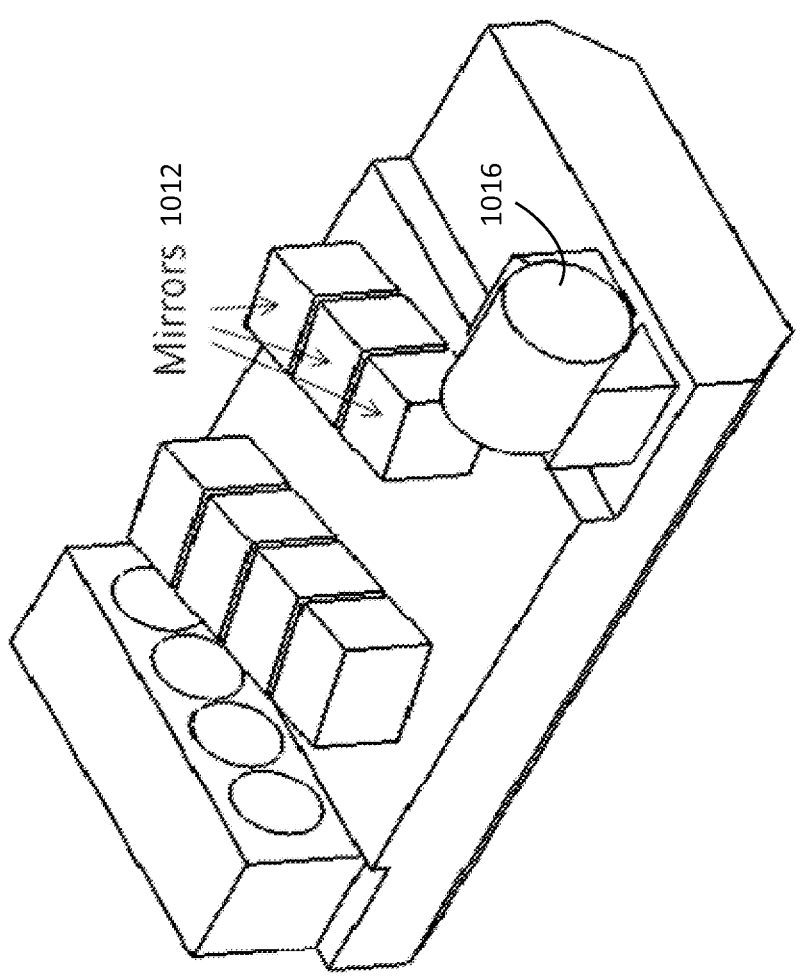
Figure 12:
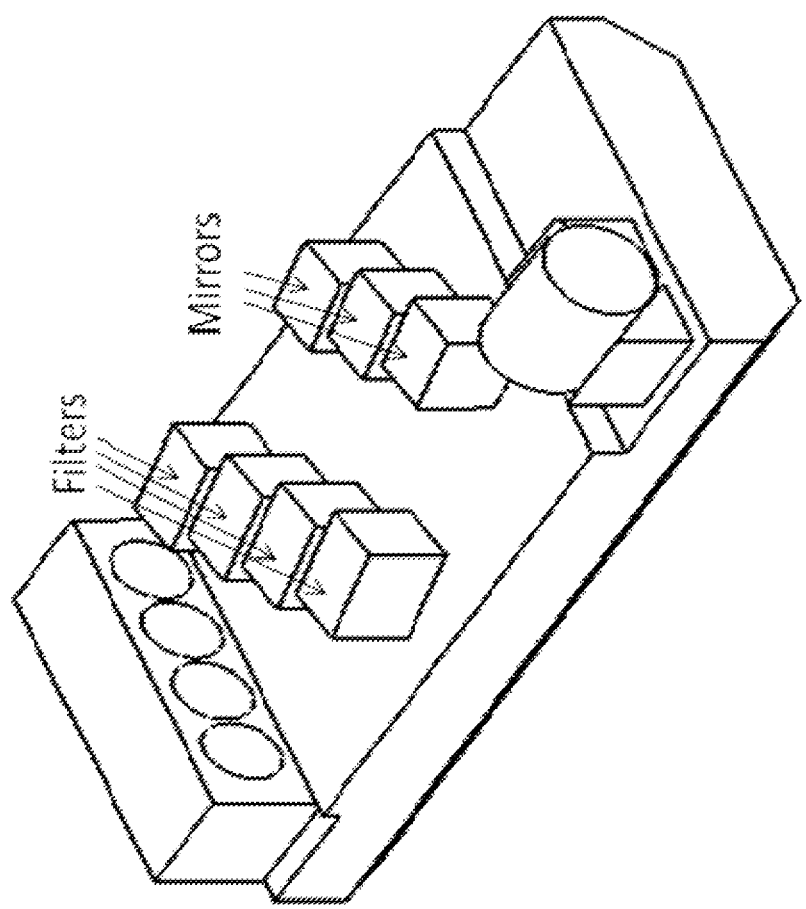
Figure 13:
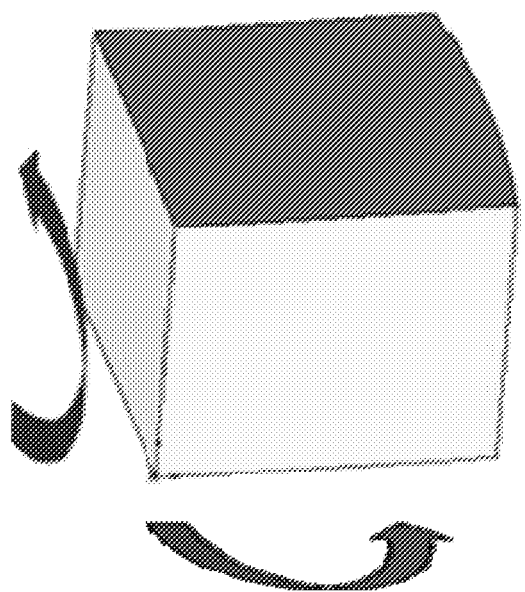
FIG. 13 shows an exemplary mirror with curved base to facilitate the adjustment of tilt angle of the mirror.

Two designs with three mirrors 1012 are respectively shown in FIG. 11 and FIG. 12. The difference in the embodiments in FIG. 11 and FIG. 12 is the offset of the mirrors and corresponding mirrors along the longer side of the device which increases the space between adjacent filters and mirrors providing more room for handling and device rotation. Each mirror can be adjusted in two angles as shown in FIG. 13. In general, the base of a mirror block is flat from a mechanical cut while it is possible to form a curved base. An exemplary mirror with curved base is shown in FIG. 13 and may be used to make adjustment of tilt angle easier. After the adjustment, each mirror is bonded to the substrate.

Figure 14:
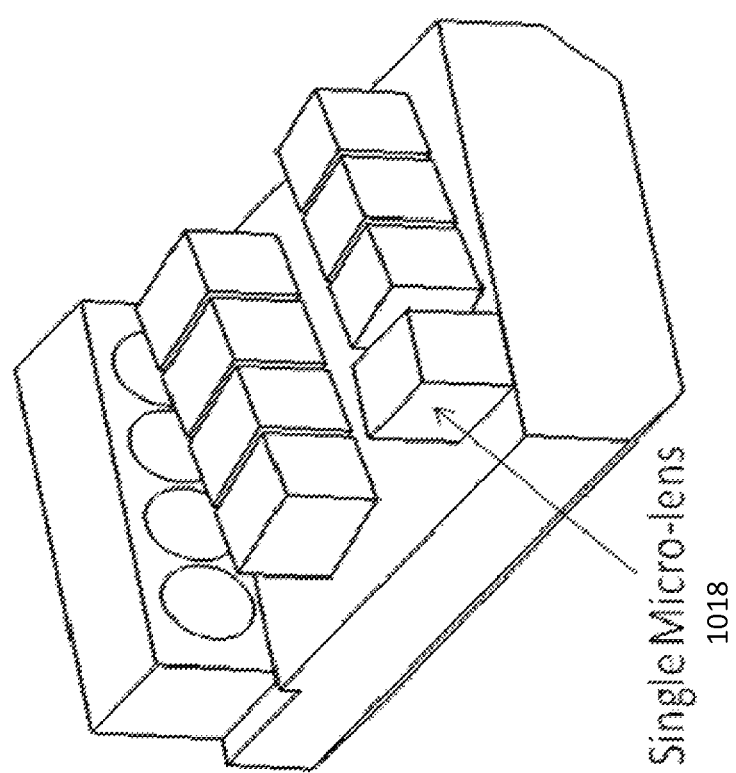

Another similar design is shown in FIG. 14 which further decreases the size of the assembly. In this design, a cubical single micro-lens 1018 replaces the collimating lens and its fixation aid wedges. The single micro-lens 1016 is fabricated similarly as the micro-lens array. The use of the cubical micro-lens has at least two major benefits: 1) it helps to reduce the size of the collimating lens and avoids physical blocking with the mirror that allows it to be positioned closer to the filter and thus reduces the size of the assembly; 2) the flat surfaces of the cubical single micro-lens 1018 created by cut or polishing makes the collimating lens possible to be mounted directly on the substrate without the need of fixation aid systems. The smaller aperture of the collimating lens in the assembly would not degrade the optical performance of the device because of the beam size being used.

Figure 15:
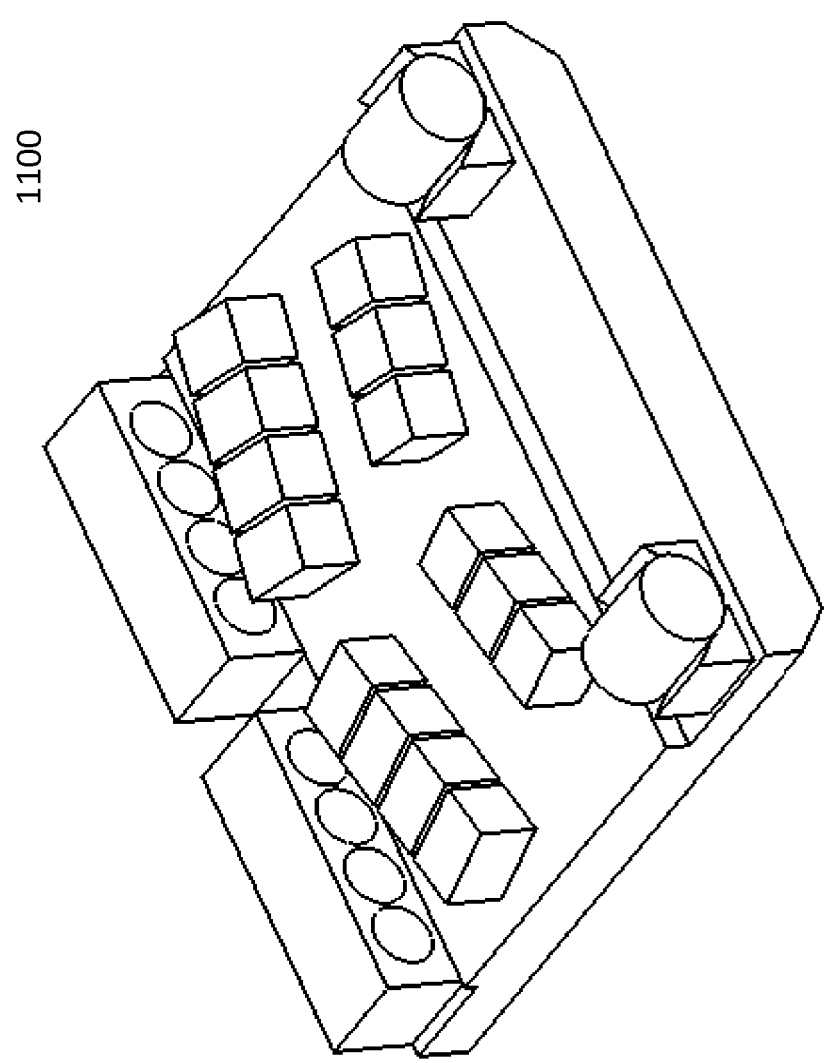
FIG. 15 is an example of paired MUX/DeMUX assembly.

According to one embodiment, it is advantageous to integrate both MUX and DeMUX functions or modules in one device. The ultra-compact MUX/DeMUX design in the present invention is a good candidate for this kind of applications by integrating two of MUX/DeMUX modules on a common substrate. FIG. 15 is an example 1100 of the paired MUX/DeMUX assembly. In this embodiment, two separate 1×4 MUX/DeMUX modules of FIG. 10 are mirrored and placed on a common substrate with the space of the two collimating lenses designed according to existing industrial standards. With this configuration 1100, multiple optical signals with wavelengths matched with the corresponding filter wavelength can be input from one of the micro-lens array. The signals can be multiplexed and output to an optical fiber by the corresponding collimating lens. On the other hand, input signal with multiple wavelengths from the other collimating lens can be demultiplexed and output though the micro-lenses. The micro-lens array may be made one piece instead of two to reduce the number of components during assembly.

Different designs, port counts and module orientations of the two modules may be integrated on the common substrate depending on the applications. The advantages of the paired configuration includes: 1) the symmetric design of the sub-assembly. The symmetric design is usually favorable when it is integrated in a system; 2) reduction of cost by sharing the parts (e.g. substrate) and potentially saving the assembly time; 3) reduction of size by packing MUX and DeMUX modules together.

Figure 16:
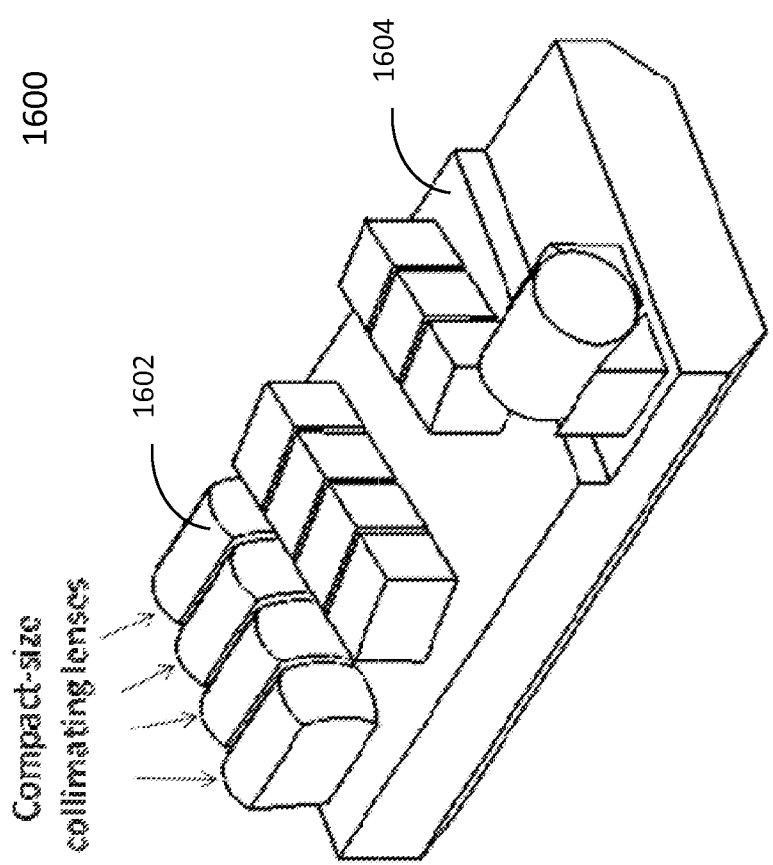
FIG. 16 shows an alternative configuration of reducing the collimating lens space.

FIG. 16 shows an alternative configuration 1600 of reducing the collimating lens space. In this design, multiple compact collimating lenses are placed side-by-side to form a collimating lens array 1602. The bottom sides of the lenses are flat so that they can be mounted directly on the substrate 1604 without using fixation aid systems. The widths of the lenses are slightly smaller than the pitch of the collimating lens array so that their positions can be adjusted independently on the substrate without blocking the adjacent collimating lens(es). The advantages of this design include: 1) the cost of the lens array can be reduced by avoiding expensive fabrication technologies; 2) the position of each collimating lens can be individually adjusted on substrate during the assembly process to compensate the losses due to fabrication errors of the lenses.

Figure 17:
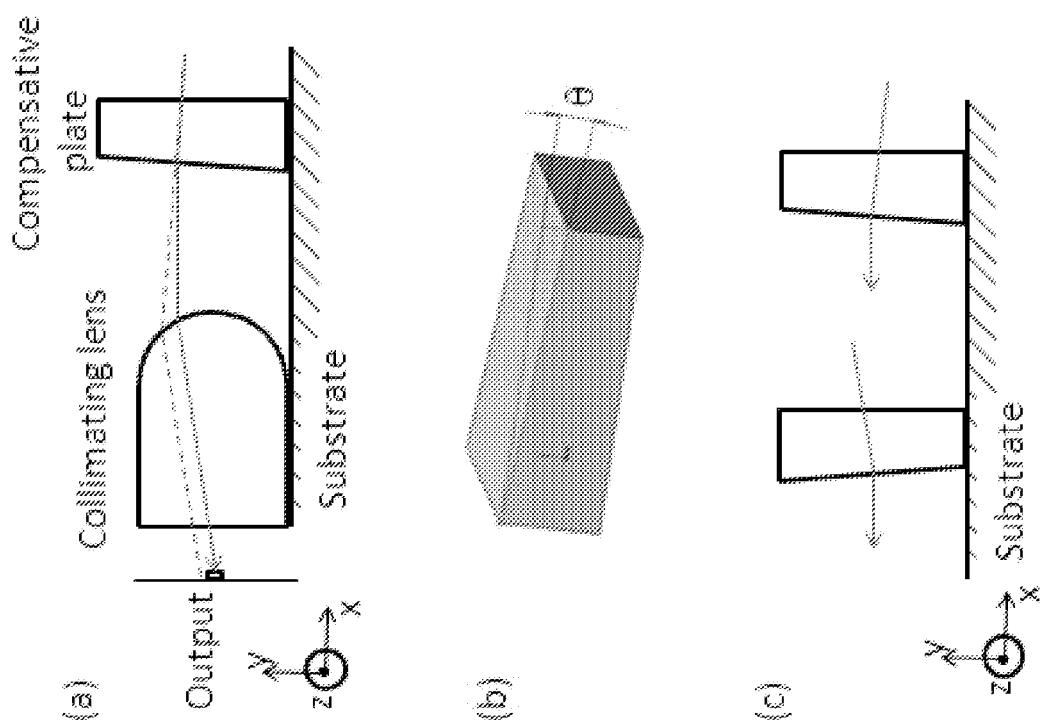
FIG. 17 shows a compensative plate that may be inserted on a light path to correct the incident angular errors and the wedge error of the collimator being used in an exemplary assembly.

As the bottom of each collimating lens is in contact with the substrate, there will be little degree of freedom to adjust the pointing angle of a collimating lens in the direction perpendicular to the substrate to compensate the residual angular errors in this direction (e.g. collimator wedge error). A compensative plate as shown in FIG. 17 may be inserted on the light path to correct the incident angular errors and the wedge error of the collimator as illustrated in FIG. 17(a). The angular errors will result in the misalignment of focused beam on y-axis at the output and thus cause extra loss. A number of compensative plates with different cut angles as shown in FIG. 17(b) may be prepared to be used during the assembly process to actively adjust the focal point onto an output point (e.g., a light detector). The compensative plate may be used in 2 different orientations to generate compensative focus offset at opposite directions as shown in FIG. 17(c). Anti-reflection coatings may be applied to the compensative plate to reduce the extra loss induced by the compensative plates due to the surface reflection.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

We claim:

1. An optical assembly comprising:
   an optical device to generate a collimated light beam;
   a mirror;
   an array of micro lenses, each of the micro lenses corresponding to one of electronic devices in an array;
   an array of filters disposed between the mirror and the micro lenses;
   a substrate on which the optical device, the mirror and the micro lenses are bonded, where the mirror is tilted with respect to the array of filters and the array of micro lenses to ensure that each of the micro lenses corresponds to a light beam coming from or going to a corresponding one of the filters; and
   a compensative plate inserted between the array of micro lenses and the array of filters to correct optical errors caused by one or more of the optical device, the mirror, the filters, and the micro lenses, wherein the compensative plate is provided to correct the optical errors in one or more but not all of light paths between the array of micro lenses and the array of filters.

2. The optical assembly of claim 1, wherein the compensative plate is an optical plate with one side slanted with respect to another side of the compensative plate.

3. The optical assembly of claim 1, wherein the mirror is composed of an array of mirrors, each of the mirrors corresponding to one of the filters.

4. The optical assembly of claim 2, wherein the mirror has a non-flat base surface to facilitate an adjustment of a tilt angle thereof towards a corresponding one of the filters, and wherein the non-flat base surface of the each of the mirrors is glued onto the substrate.

5. The optical assembly of claim 2, wherein each of the mirrors has a flat base surface from a mechanical cut and is glued directly onto the substrate.

6. The optical assembly of claim 2, wherein the array of filters are disposed with a predefined offset between any two of the filters, and the array of mirrors are disposed with a corresponding predefined offset between any two of the mirrors.

7. The optical assembly of claim 1, wherein the optical device to generate a collimated light beam is a collimator.

8. The optical assembly of claim 1, wherein the optical device to generate a collimated light beam is a cubical single micro-lens mounted directly on the substrate without any fixation aids.

9. The optical assembly of claim 1, wherein the optical device couples a light beam containing a number of wavelengths to a first filter of the array of filters, where the first filter passes a signal with a specified wavelength and reflects a signal containing all other wavelengths to the mirror.

10. The optical assembly of claim 9, wherein the reflected signal containing all other wavelengths is bounced by the mirror back to a second filter of the array of filters, where the second filter passes a signal with a specified wavelength and reflects a signal containing all other wavelengths.

11. The optical assembly of claim 10, wherein transmitted signals from at least the first and second filters are respectively coupled by corresponding micro lenses to corresponding receivers outside the optical assembly.

12. The optical assembly of claim 11, further comprising a compensative plate inserted between the array of micro and the array of filters to correct angular errors of one or more of the transmitted signals.

13. The optical assembly of claim 1, wherein the optical assembly fits in a Quad Small Form-factor Pluggable (QSFP) optical module.

14. An optical assembly comprising:
a substrate;
a multiplexier module; and
a demultiplexier module, wherein both of the multiplexier and the demultiplexier share an identical structure but are mirrored and disposed on the substrate to provide functions of multiplexing and demultiplexing in the optical assembly simultaneously, wherein the structure includes a collimator, and a compensative plate provided to correct optical errors in one or more but not all of light paths in the structure, a distance of the collimator for the multiplexier module and the collimator for the demultiplexier module is fixed per an industrial standard.

15. The optical assembly of claim 14, wherein the structure for the multiplexing module includes:
a mirror;
an array of micro lenses, each of the micro lenses corresponding to one of electronic devices provided to generate light beams coupled to the structure for the multiplexing module;
an array of filters disposed between the mirror and the micro lenses; and
a substrate on which the mirror and the micro lenses are boned, where the mirror is tilted with respect to the array of filters and the array of micro lenses to ensure that each of the micro lenses couples one of the light beams to a corresponding one of the filters.

16. The optical assembly of claim 14, wherein the structure for the demultiplexier module comprises:
a mirror;
an array of micro lenses, each of the micro lenses corresponding to one of sensing devices provided to receive light beams from the structure for the demultiplexing module;
an array of filters disposed between the mirror and the micro lenses; and
a substrate on which the mirror and the micro lenses are boned, where the mirror is tilted with respect to the array of filters and the array of micro lenses to ensure that each of the micro lenses receives one of the light beams from a corresponding one of the filters and couples the one of the light beams to one of the sensing devices.

17. The optical assembly of claim 16, wherein the mirror is composed of an array of mirrors, each of the mirrors corresponding to one of the filters.

18. The optical assembly of claim 17, wherein each of the mirrors has a non-flat base surface to facilitate an adjustment of a tilt angle thereof towards a corresponding one of the filters, and wherein the non-flat base surface of the each of the mirrors is glued onto the substrate.

19. The optical assembly of claim 16, wherein the array of filters are disposed with a predefined offset between any two of the filters, and the array of mirrors are disposed with a corresponding predefined offset between any two of the mirrors.

20. The optical assembly of claim 14, wherein the optical device to generate a collimated light beam is a collimator.

21. The optical assembly of claim 14, wherein the optical device to generate a collimated light beam is a cubical single micro-lens mounted directly on the substrate without any fixation aids.

22. The optical assembly of claim 14, further comprising a compensative plate inserted between the array of micro and the array of filters to correct angular errors of one or more of the transmitted signals.

* * * * *